United States Patent [19]

Swallow et al.

[11] Patent Number: 5,106,646
[45] Date of Patent: Apr. 21, 1992

[54] STABILIZED LOW CALORIE SYRUP WITH REDUCED SWEETENER SOLIDS CONTENT

[75] Inventors: Nancy A. Swallow, Stamford, Conn.; Karl R. Ackermann, Croton-On-Hudson, N.Y.

[73] Assignee: Kraft General Foods, Inc., Glenview, Ill.

[21] Appl. No.: 638,581

[22] Filed: Jan. 8, 1991

[51] Int. Cl.$^5$ .................................................. A23L 1/05
[52] U.S. Cl. ................................... 426/658; 426/573; 426/654; 426/804
[58] Field of Search .............. 426/658, 569, 573, 654, 426/490, 804

[56] References Cited

U.S. PATENT DOCUMENTS

| | | | |
|---|---|---|---|
| 3,897,262 | 7/1975 | Carlson | 127/55 |
| 4,394,399 | 7/1983 | Keyser et al. | 426/573 |
| 4,443,482 | 4/1984 | Schopf et al. | 426/106 |
| 4,528,205 | 7/1985 | Turrisi et al. | 426/804 |
| 4,785,521 | 11/1988 | Bennett | 426/658 |
| 4,786,521 | 11/1988 | Bennett et al. | 426/804 |
| 4,826,656 | 5/1989 | Huber et al. | 426/565 |

*Primary Examiner*—Donald E. Czaja
*Assistant Examiner*—Helen Pratt
*Attorney, Agent, or Firm*—Thomas R. Savoie

[57] ABSTRACT

An aqueous table syrup comprising water, sugar solids in an amount of less than 10% by weight, based on the weight of the syrup, carboxymethylcellulose gum in an amount sufficient to impart to the syrup a viscosity at 70° F. of from 200 to 2,000 cps, and cellulase-free xanthan gum in an amount sufficient to stabilize the carboxymethylcellulose gum, whereby the viscosity of the syrup does not decrease more than 40% when stored at 70° F. for six months.

8 Claims, No Drawings

STABILIZED LOW CALORIE SYRUP WITH REDUCED SWEETENER SOLIDS CONTENT

BACKGROUND OF THE INVENTION

1. Field of the Invention

This invention relates to a stable low calorie edible syrup with reduced sugar solids content.

2. Background of the Invention

For a long time attempts have been made to obtain a table syrup having a low caloric content and a reduced sugar solids content and which is comparable to conventional, high sugar solids syrups in taste, mouthfeel, pourability, viscosity, and stability. However, problems have arisen in producing low calorie table syrups, particularly in producing low calorie table syrup with a sugar solids content of less than 10% by weight.

Attempts to produce table syrup with a reduced sugar content are disclosed in U.S. Pat. No. 4,785,521 by Bennett which discloses an aqueous table syrup with reduced sugar content consisting essentially of water, sugar, alginate, cellulose gum and maltodextrin. However, the minimum sugar content in the syrup is at least 15% by weight, and more preferably at least 30% by weight.

U.S. Pat. No. 4,528,205 by Turrisi discloses a reduced calorie table syrup containing a mixture of alginate and clarified xanthan gum which exhibits special thickening and organoleptic properties. However, the minimum sugar solid content in the syrup is at least 10% by weight, and more preferably at about 40% by weight.

U.S. Pat. No. 4,394,399 by Keyser discloses a low calorie table syrup product consisting essentially of water, sugar, cellulose gum, salt, flavoring agents, antimycotic agent and sodium hexametaphosphate. However, the sugar solids content in the syrup is preferably in the range of about 40% by weight.

U.S. Pat. No. 3,897,262 by Carlson discloses a process which employs a diatomaceous earth filter aid to partially clarify a concentrated pasteurized semirefined sucrose syrup containing naturally occurring colloidal substances, and combining this filtered syrup with a softened water containing carboxymethyl cellulose (CMC) in amounts to reduce the Brix and increase the viscosity of the filtered syrup. However, the sugar solids content in the syrup is about 58% by weight.

Carboxymethyl cellulose gum has been used in table syrup products as a thickener which contributes to mouthfeel and viscosity. However, in low calorie table syrup products, especially in syrup products containing less than 10% sugar solids, carboxymethylcellulose gum hydolyzes very quickly, resulting in a thin, watery product having poor stability and mouthfeel. It also has been found that xanthan gum is very stable in low solids syrups, but this gum causes an undesirable gelatinous texture and unacceptable mouthfeel for table syrup products.

It is an object of the present invention to provide an aqueous table syrup of reduced sugar solids content and reduced caloric content which is comparable in quality and stability to conventional table syrups of higher sugar solids and caloric content.

It is a further object of the invention to provide a stable table syrup having reduced sugar solids, and having good organoleptic and pouring properties. It is still a further object of the invention to provide a stable table syrup having less than 10% sugar solids content and having a content of carboxymethylcellulose sufficient to impart a desired viscosity to the table syrup.

BRIEF SUMMARY OF THE INVENTION

The foregoing and other objects which will be apparent to those of ordinary skill in the art are achieved in accordance with the present invention by providing in an aqueous table syrup comprising water, sugar solids in an amount of less than 10% by weight, based on the weight of the syrup, carboxymethylcellulose gum in an amount sufficient to impart to the syrup a final syrup viscosity at 70° F. of from 200 to 2,000 cps, and cellulase-free xanthan gum in an amount sufficient to stabilize the carboxymethylcellulose gum, whereby the viscosity of the syrup does not decrease more than 40% when stored at 70° F. for six months.

DETAILED DESCRIPTION OF THE INVENTION

It has been found that low calorie syrup with reduced sugar solids content can be thickened and stabilized with a combination of carboxymethyl cellulose and cellulase-free xanthan gum. In combination, the gums provided good organoleptic properties and stability to a low calorie syrup product with reduced sugar solids content. The present invention provides a stable table syrup which has significantly reduced caloric content. The aqueous table syrup of the invention comprises water, less than 10% by weight sugar solids, carboxymethylcellulose gum and a cellulase-free xanthan gum.

The sugar used in the present invention can be one or more of the water soluble carbohydrate sugars conventionally used in foods such as cane or beet sucrose, glucose, maltose, fructose, high or low fructose corn syrups and the like. The sugar is used in the table syrup of the invention in amounts such that the total sugar solids content of the product is less than 10% by weight. The sugar can be incorporated in the table syrup in solid form or in the form of a liquid sugar syrup. Preferably, the total sugar solids content of the product of the invention is maintained in the range of about 5 to 9.5% by weight. Non-sugar sweeteners which are stable in aqueous systems, including natural sweeteners and artificial sweeteners such as sucralose, saccharin, acetlsulfame, dihydrochalcones, etc., can be added to achieve a desired level of sweetness.

The carboxymethylcellulose gum employed in the present table syrup is a water-soluble food grade gum which imparts to the table syrup product a viscosity suitable for table syrup products, preferably in the range of about 200 to 2000 cps at 70° F. and preferably 500 to 1600 cps at 70° F. Suitable carboxymethylcellulose gums include those having a molecular weight such that the viscosity, in a 2% by weight solution in water, is in the range of 500 to 6000 cps, preferably 800 to 3100 cps, at 25° C. By "water soluble" is meant that the gum is readily soluble in water at the levels employed to impart a suitable viscosity to the table syrup product. Commercially available medium or high viscosity carboxymethyl-cellulose gums having a degree of carboxymethyl substitution of about 0.65 to 1.0, preferably 0.8 to 0.95, are suitable. Metal salts of carboxymethylcellulose gums, particularly the sodium salt, have suitable water solubility and are preferred. As mentioned above, the carboxymethylcellulose gum is used in an amount sufficient to impart to the syrup a viscosity suitable for a table syrup product. Of course other ingredients, including sugar solids and xanthan gum also contribute to viscosity of the table syrup and it will be understood that the viscosity of the product is not entirely due to the carboxymethylcellulose gum. In general, suitable table syrup viscosity is achieved with a level of carboxymethylcellulose gum of about 0.3 to 3% by weight, and preferably about 0.5 to 2% by weight. Suitable commercially available carboxymethylcellulose gums include those of the Aqualon Company, Wilmington, Del., designated 9M31F, 9M8, and 7M8S.

The xanthan gum used in the present invention is water soluble at the levels employed and is cellulase-free since cellulase breaks down carboxymethylcellulose gum. This kind of cellulase-free xanthan gum is well known and commercially available such as, for example, from Merck & Co., Inc., Rahway, New Jersey, under the designation of Keltrol T which is a clarified, finely milled grade of free-flowing xanthan gum suitable for use in food preparations and having a molecular weight of about $10^6$, a viscosity of about 1000 to 2000, preferably 1200 to 1600, at a level of 1% by weight in a 1% by weight solution of potassium chloride in water at 25° C. The cellulase-free xanthan gum is used in the present invention in an amount sufficient to stabilize the carboxymethylcellulose gum. By "stabilize" is meant that the viscosity of the table syrup does not decrease more than 40%, preferably not more than 30%, and still preferably not more than 25%, after six months storage at 70° F. Generally, about 15 to 75% by weight xanthan gum, based on the weight of the carboxymethylcellulose gum, is suitable. Preferably, the cellulase-free xanthan gum is present in an amount of from 20 to 60% by weight based on the weight of the carboxymethylcellulose gum.

If desired, preservatives, salt and other flavorants, colorants, and other conventional additives can be included in the table syrup. Suitable preservatives include sorbic acid, sodium benzoate, and potassium sorbate. The amount of each particular preservative can vary but will in general be on the order of 0.01–1% by weight. Salt and other flavorants and colorants can be added as in conventional table syrups. The amount of salt, if added, will generally be in the range of up to 1% by weight and the amount of flavorant or colorant will generally be about 0.1–1% by weight. Combinations of colorants or flavorants may, of course, be used.

The balance of the composition is made up of water. "Soft water" is preferred. By "soft water" is meant water which has a total hardness (calcium and magnesium) content of not more than 100 ppm, preferably not more than 70 ppm. Water of greater hardness can be softened by conventional water softening processes. The amount of water in the composition can vary widely but will generally be about 70 to 90% by weight.

The syrups prepared according to the instant invention have excellent gum stability as well as very good mouthfeel. The viscosity of the table syrup (generally in the range of 200 to 2000 cps at 70° F.) does not decrease more than 40% when stored at 70° F. for six months. Moreover, the table syrup does not gel when refrigerated at 40° F. for a long period of time. The texture of the syrup is comparable to that of conventional table syrup. The combination of these good features is provided by the gum system of carboxymethylcellulose/cellulase-free xanthan gum. This gum system avoids the problems encountered by using carboxymethylcellulose gum alone, i.e., poor gum stability in low sugar solids content table syrups, as well as the unacceptable mouthfeel in the low sugar solids content table syrup where xanthan gum alone is utilized as a thickener.

EXAMPLE 1

A table syrup is blended and formed from the ingredients shown in Table 1.

TABLE 1

| Ingredient | % by weight |
| --- | --- |
| Water | 87.88 |
| Liquid Fructose (77% solids) | 9.10 |
| Flavor | 0.88 |
| Carboxymethylcellulose Gum (CMC) (Aqualon 9M31F) | 1.00 |
| Trisodium Citrate | 0.35 |
| Cellulase-free Xanthan Gum (Keltrol T) | 0.30 |
| Salt | 0.20 |
| Sorbic Acid | 0.13 |
| Sodium Benzoate | 0.10 |
| Artificial Sweetener | 0.06 |
| Total | 100.00 |

This composition results in a table syrup having good mouthfeel and a viscosity of 860 cps at 70° F. The syrup is stored at 70° F. The viscosity of the syrup is checked every month for seven months. The results are shown in Table II.

TABLE II

|  | Viscosity (cps at 70° F.) | % decrease of viscosity |
| --- | --- | --- |
| Initial | 860 | 0 |
| 1 month | 800 | 6.98 |
| 2 months | 770 | 10.46 |
| 3 months | 770 | 10.46 |
| 4 months | 680 | 20.93 |
| 5 months | 610 | 29.07 |
| 6 months | 600 | 30.23 |
| 7 months | 560 | 34.88 |

EXAMPLE 2

A table syrup is prepared as described in Example 1 except adding 0.20% by weight of phosphoric acid and using 87.68% by weight of water instead of 87.88% by weight as shown in Table III.

TABLE III

| Ingredients | % by weight |
| --- | --- |
| Water | 87.68 |
| Liquid Fructose (77% solids) | 9.10 |
| Flavor | 0.88 |
| Carboxymethylcellulose Gum (CMC) (Aqualon 9M31F) | 1.00 |
| Trisodium Citrate | 0.35 |
| Cellulase-free Xanthan Gum (Keltrol T) | 0.30 |
| Salt | 0.20 |
| Phosphoric Acid | 0.20 |
| Sorbic Acid | 0.13 |
| Sodium Benzoate | 0.10 |
| Artificial Sweetene | 0.06 |
| Total | 100.00 |

This composition results in a table syrup having good mouthfeel and a viscosity of 840 cps at 70° F. The syrup is stored at 70° F. The viscosity of the syrup is checked every month for seven months. The results are shown in Table IV.

TABLE IV

|  | Viscosity (cps at 70° F.) | % decrease of viscosity |
| --- | --- | --- |
| Initial | 840 | 0 |

TABLE IV-continued

|   | Viscosity (cps at 70° F.) | % decrease of viscosity |
|---|---|---|
| 1 month | 760 | 9.52 |
| 2 months | 740 | 11.91 |
| 3 months | 720 | 15.00 |
| 4 months | 720 | 15.00 |
| 5 months | 690 | 17.86 |
| 6 months | — | — |
| 7 months | 670 | 20.24 |

EXAMPLE 3

A table syrup is prepared as described in Example 1 except that the amount of CMC is changed to 1.2% by weight and the amount of xanthan gum is changed to 0.4% by weight, as shown in Table V.

TABLE V

| Ingredient | % by weight |
|---|---|
| Water | 87.38 |
| Liquid Fructose | 9.1 |
| Flavor | 0.88 |
| Carboxymethylcellulose Gum (CMC) (Aqualon 9C31F) | 1.20 |
| Trisodium Nitrate | 0.35 |
| Cellulase-free Xanthan Gum (Keltrol T) | 0.40 |
| Salt | 0.20 |
| Phosphoric Acid | 0.20 |
| Sorbic Acid | 0.13 |
| Sodium Benzoate | 0.10 |
| Artificial Sweetener | 0.06 |
|  | 100.00 |

This composition results in a table syrup having good mouthfeel and a viscosity of 1450 cps at 70°. This syrup is stored at 70° F. and the viscosity of the syrup is checked every month for seven months. The results are shown in Table VI.

TABLE VI

|   | Viscosity (at 70° F. cps) | % decrease of viscosity |
|---|---|---|
| Initial | 1450 | 0 |
| 1 month | 1430 | 1.37 |
| 2 months | 1400 | 3.45 |
| 3 months | 1300 | 10.34 |
| 4 months | 1170 | 19.31 |
| 5 months | 1020 | 29.66 |
| 6 months | 990 | 31.72 |
| 7 months | 930 | 35.86 |

COMPARISON EXAMPLE A

A comparison table syrup is made from the ingredients as shown in Table VII. In this composition, only carboxymethylcellulose gum is used.

TABLE VII

| Ingredients | % by weight |
|---|---|
| Water | 87.52 |
| Liquid Fructose | 9.10 |
| Carboxymethylcellulose Gum (CMC) (Aqualon 9M31F) | 1.70 |
| Flavor | 0.84 |
| Trisodium Citrate | 0.35 |
| Salt | 0.20 |
| Sorbic Acid | 0.13 |
| Sodium Benzoate | 0.10 |
| Artificial Sweetener | 0.06 |
| Total | 100.00 |

This composition results in a table syrup having good mouthfeel and a viscosity of 820 cps at 70° F. The syrup is stored at 70° F. for 7 months. The viscosity of the syrup is checked during the storage period. The results are shown in Table VIII.

TABLE VIII

|   | Viscosity (cps at 70° F.) | % decrease of viscosity |
|---|---|---|
| Initial | 820 | 0 |
| 1 month | 570 | 30.49 |
| 2 months | 360 | 56.09 |
| 3 months | 270 | 67.71 |
| 4 months | — | — |
| 5 months | — | — |
| 6 months | 230 | 71.95 |
| 7 months | 160 | 80.49 |

COMPARISON EXAMPLE A

A comparison composition is prepared from the ingredients shown in Table IX.

TABLE IX

| Ingredient | % by weight |
|---|---|
| Water | 87.52 |
| Liquid Fructose | 9.10 |
| Carboxymethylcellulose Gum (CMC) (Aqualon 9M31F) | 1.70 |
| Flavor | 0.84 |
| Sodium Hexametaphosphate | 0.35 |
| Salt | 0.20 |
| Sorbic Acid | 0.13 |
| Sodium Benzoate | 0.10 |
| Artificial Sweetener | 0.06 |
| Total | 100.00 |

This composition results in a table syrup having good mouthfeel and a viscosity of 700 cps at 70° F. The syrup is stored at 70° F. for 7 months. The viscosity of the syrup is checked every month during the storage period. The collected data is shown in Table X.

TABLE X

|   | Viscosity (cps at 70° F.) | % decrease of viscosity |
|---|---|---|
| Initial | 700 | 0 |
| 1 month | 600 | 14.29 |
| 2 months | 590 | 15.71 |
| 3 months | 500 | 28.57 |
| 4 months | 448 | 36.00 |
| 5 months | 420 | 40.00 |
| 6 months | 360 | 48.57 |
| 7 months | 288 | 58.86 |

COMPARISON EXAMPLE C

Another comparison table syrup is prepared from the ingredients listed in Table XI. The xanthan gum employed in this example has a significant cellulase content.

TABLE XI

| Ingredient | % by weight |
|---|---|
| Water | 87.47 |
| Liquid Fructose | 9.10 |
| Carboxymethylcellulose Gum (CMC) (Aqualon (9M31F) | 1.70 |
| Flavor | 0.84 |
| Xanthan gum (Keltrol F) | 0.05 |
| sodium Hexametaphosphate | 0.35 |
| Salt | 0.20 |
| Sorbic Acid | 0.13 |
| Sodium Benzoate | 0.10 |
| Artificial Sweetener | 0.06 |

TABLE XI-continued

| Ingredient | % by weight |
| --- | --- |
| Total | 100.00 |

This composition results in a table syrup having good mouthfeel and a viscosity of 880 cps at 70° F. The table syrup is stored at 70° F. for 7 months. The viscosity of the syrup is measured every month during the storage period. The collected data is shown in Table XII.

TABLE XII

| | Viscosity (cps at 70° F.) | % decrease of viscosity |
| --- | --- | --- |
| Initial | 880 | 0 |
| 1 month | 620 | 29.55 |
| 2 months | 500 | 43.18 |
| 3 months | 390 | 55.68 |
| 4 months | 320 | 63.64 |
| 5 months | 298 | 66.14 |
| 6 months | 240 | 72.73 |
| 7 months | 222 | 74.77 |

COMPARISON EXAMPLES D-G

In each of these comparison examples, Example 1 is repeated except for the gum which is indicated in Table XIII. None of the gums utilized in these formulations is fully satisfactory as shown in Table XIII. For table syrup having a sugar solids content of less than 10% by weight, neither CMC gum alone nor xanthan gum can achieve satisfactory gum stability as well as good organoleptic properties such as mouthfeel. Carboxymethylcellulose gum can achieve good texture and mouthfeel in a low sugar solids table syrup, but cannot also achieve good gum stability. Xanthan gum can produce stable low sugar solids table syrup, but such syrups have a totally unacceptable slimy mouthfeel.

TABLE XIII

| Comparative Example | Gum System | Viscosity (cps. at 70° F.) | | | | | Texture/ Mouthfeel |
| --- | --- | --- | --- | --- | --- | --- | --- |
| | | 0 | 1 mo. | 3 mos. | 5 mos. | 7 mos. | |
| D | 1.7% CMC | 680 | 560 | 416 | 340 | 160 | Good |
| E | 1.7% CMC | 620 | 500 | 280 | 180 | 115 | Good |
| F | 0.5% xanthan gum (Keltrol F - Contains cellulase) | 860 | 810 | 790 | 830 | 840 | Unacceptable |
| G | 0.5% xanthan gum (Keltrol T cellulase-free) | 820 | 840 | 810 | 820 | 830 | Unacceptable |

COMPARISON EXAMPLE H

Comparison Example A is followed except propylene glycol alginate (PGA), in an amount of 1.0%, is used in lieu of CMC. Initial viscosity (at 70° F.) of the table syrup is 580 cps and is 100 cps after only one month.

COMPARISON EXAMPLE I

Comparison Example H is followed except that PGA is used at a level of 1.2% and 0.1% xanthan gum is added. The table syrup has an initial viscosity of 420 cps at 70° F. the room temperature viscosity remains stable, but the syrup thickens after storage at 40° F. for four months. Texture is gelatinous and unacceptable.

COMPARISON EXAMPLE J

Comparison Example I is followed except that the PGA level is increased to 1.3% and the xanthan gum level is 0.15%. Initial viscosity is 860 cps at 70° F. While the room temperature viscosity of the table syrup product remains stable, the syrup gels after storage at 40° F. for one month.

As mentioned above, the table syrup of the present invention does not gel when refrigerated at 40° F. for a long period of time. On the other hand, the use of PGA and xanthan gum in a table syrup results in rapid thickening and gelling when stored under refrigeration. These results are illustrated in the viscosity data in Table XIV for the syrups of Example 2 and comparison examples I and J after storage at 40° F.

TABLE XIV

| | Viscosity (cps at 25° C.) After Storage at 40° F. | | |
| --- | --- | --- | --- |
| | Example 2 | Comparison J | Comparison I |
| INITIAL | 860 | 860 | 420 |
| 1 month | 860 | 3825* | 980 |
| 2 months | 860 | 10,000** | 936 |
| 3 months | 850 | 7,000* | 1010 |
| 4 months | 826 | 8,000* | 890 |
| 5 months | 830 | 4,350* | 1040 |
| 6 months | 850 | 3,860* | — |
| 7 months | 910 | — | — |
| 8 months | 910 | — | — |

*All samples remain gel at room temperature.
**Samples thicken and become very gelatinous.

What is claimed is:

1. A low calorie, aqueous table syrup comprising at least 70% by weight of water, sugar solids in an amount of less than 10% by weight, based on the weight of the syrup, an artificial sweetener, and a gum system consisting of carboxymethylcellulose gum and xanthan gum wherein the carboxymethylcellulose gum is present in an amount sufficient to impart to the syrup a desired viscosity suitable for a table syrup, and wherein the xanthan gum is a cellulase-free xanthan gum present in an amount of from 15% to 75% by weight of the carboxymethylcellulose gum and sufficient to stabilize the carboxymethylcellulose gum, whereby the viscosity of the table syrup when stored at 70° F. does not decrease more than 40% after seven months.

2. An aqueous table syrup according to claim 1 wherein the carboxymethylcellulose gum is present in an amount sufficient to impart to the syrup a viscosity at 70° F. of from 200 to 2,000 cps.

3. An aqueous table syrup according to claim 1 wherein the carboxymethylcellulose gum is present in an amount sufficient to impart to the syrup a viscosity at 70° F. of from 500 to 1,600 cps.

4. An aqueous table syrup according to claim 1 wherein the xanthan gum is present in an amount of from 20 to 60% by weight based on the weight of the carboxymethylcellulose gum.

5. An aqueous table syrup according to claim 4 wherein the carboxymethylcellulose gum is present in an amount of 0.3 to 3% by weight based on the weight of the table syrup.

6. An aqueous table syrup according to claim 5 wherein said carboxymethylcellulose gum has a molecular weight sufficient to yield a viscosity in the range of about 500 to 6,000 cps in a 2 percent aqueous solution at 25° C.

7. An aqueous table syrup according to claim 6 wherein the carboxymethylcellulose gum has a molecular weight sufficient to yield a viscosity in the range of about 800 to 3,100 cps in a 2 percent aqueous solution at 25° C.

8. An aqueous table syrup according to claim 1 wherein the cellulase-free xanthan gum has a molecular weight sufficient to yield a viscosity in the range of about 1,000 to about 2,000 cps at a level of 1% by weight in a 1% by weight solution of potassium chloride in water at 25° C.

* * * * *